US009433016B2

(12) United States Patent
Yang et al.

(10) Patent No.: US 9,433,016 B2
(45) Date of Patent: Aug. 30, 2016

(54) SYSTEM AND METHOD FOR DETECTING AND RESOLVING CONFLICTS

(71) Applicant: Futurewei Technologies, Inc., Plano, TX (US)

(72) Inventors: Yunsong Yang, San Diego, CA (US); Younghoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 34 days.

(21) Appl. No.: 14/301,232

(22) Filed: Jun. 10, 2014

(65) Prior Publication Data

US 2014/0376519 A1   Dec. 25, 2014

Related U.S. Application Data

(60) Provisional application No. 61/839,178, filed on Jun. 25, 2013.

(51) Int. Cl.
*H04J 3/00* (2006.01)
*H04W 74/08* (2009.01)
*H04L 29/12* (2006.01)

(52) U.S. Cl.
CPC ...... *H04W 74/0816* (2013.01); *H04L 61/2038* (2013.01); *H04L 61/2046* (2013.01); *H04L 61/6022* (2013.01)

(58) Field of Classification Search
None
See application file for complete search history.

(56) References Cited

U.S. PATENT DOCUMENTS

| 2003/0177267 | A1 | 9/2003 | Orava et al. |
| 2006/0227802 | A1 | 10/2006 | Du et al. |
| 2008/0240021 | A1 | 10/2008 | Guo et al. |
| 2011/0002255 | A1* | 1/2011 | Dharmaraju ........ H04L 12/1881 370/312 |

FOREIGN PATENT DOCUMENTS

| CN | 1842001 A | 10/2006 |
| CN | 101631337 A | 1/2010 |
| CN | 101641883 A | 2/2010 |
| CN | 101651925 A | 2/2010 |

(Continued)

OTHER PUBLICATIONS

"IEEE Standard for Local and Metropolitan Area Networks: Overview and Architecture," IEEE Std 802-2001 (Revision of IEEE Std 802-1990), IEEE Computer Society, Mar. 21, 2007, 47 pages.

(Continued)

*Primary Examiner* — Kevin C Harper
(74) *Attorney, Agent, or Firm* — Futurewei Technologies, Inc.

(57) ABSTRACT

A method for operating a first device includes transmitting a conflict query frame including a first address field containing a first locally assigned identifier associated with the first device, wherein the conflict query frame further includes a second address field and has a structure of a first legacy frame, and determining if a conflict notification corresponding to the conflict query frame is received within a specified time interval after transmitting the conflict query frame. The method also includes discontinuing use of the first locally assigned identifier if the conflict notification is received within the specified time interval, and continuing use of the first locally assigned identifier if the conflict notification is not received within the specified time interval.

48 Claims, 9 Drawing Sheets

(56) References Cited

FOREIGN PATENT DOCUMENTS

| WO | 02/103943 A1 | 12/2002 |
| WO | 2012060781 A1 | 5/2012 |

OTHER PUBLICATIONS

IEEE Standard for Information technology—Telecommunications and information exchange between systems Local and metropolitan area networks—Specific Requirements Part:11 Wireless LAN Medium Access Control (MAC) and Physical Layer (PHY) Specifications, IEEE Std 802.11-2012 (Revision of IEEE Std 802.11-2007), IEEE Computer Society, Mar. 29, 2012, 2,793 pages.

"Marketing Requirements Document for Interoperablity Testing of Neighbor Awareness Networking," Version 1.0, Nov. 28, 2012, 26 pages.

"Specification Requirements Document for Neighbor Awareness Networking," Version 0.08, Wi-Fi Alliance, Neighbor Awareness Networking Marketing Task Group, Jan. 23, 2013, 9 pages.

Supplementary European Search Report for EP 14816653.1, dated Jun. 21, 2016, 8 pages.

* cited by examiner

SYSTEM AND METHOD FOR DETECTING AND RESOLVING CONFLICTS

This application claims the benefit of U.S. Provisional Application No. 61/839,178, filed on Jun. 25, 2013, entitled "Method and System for Detecting and Resolving a Conflict of Identities," which application is hereby incorporated herein by reference.

TECHNICAL FIELD

The present disclosure relates generally to digital communications, and more particularly to a system and method for detecting and resolving conflicts.

BACKGROUND

A neighbor awareness networking (NAN) certification program is currently being developed by the Wi-Fi Alliance NAN Technical Task Groups to provide Wi-Fi technology with a low-power mechanism that is run in devices in the background to make the devices neighbor aware. The NAN will enable mobile devices to efficiently discover people and services operating within their proximity. The NAN should scale effectively in dense Wi-Fi environments and complement the high data rate connectivity of Wi-Fi by providing information about people and services in the proximity. It is envisioned that the typical applications for NAN include Wi-Fi based mobile social networking, mobile commerce, mobile advertising, wireless multi-player gaming, and the like.

SUMMARY OF THE DISCLOSURE

Example embodiments of the present disclosure which provide a system and method for detecting and resolving conflicts.

In accordance with an example embodiment of the present disclosure, a method for operating a first device is provided. The method transmitting a conflict query frame including a first address field containing a first locally assigned identifier associated with the first device, wherein the conflict query frame further includes a second address field and has a structure of a first legacy frame, and determining if a conflict notification corresponding to the conflict query frame is received within a specified time interval after transmitting the conflict query frame. The method also includes discontinuing use of the first locally assigned identifier if the conflict notification is received within the specified time interval, and continuing use of the first locally assigned identifier if the conflict notification is not received within the specified time interval.

In accordance with another example embodiment of the present disclosure, a method for operating a second device is provided. The method includes receiving a conflict query frame including a first address field containing a first locally assigned identifier associated with a first device, wherein the conflict query frame further includes a second address field and has a structure of a first legacy frame, and transmitting a conflict response frame, beginning at a specified time, in response to determining that the first locally assigned identifier matches a second locally assigned identifier associated with the second device, wherein the conflict response frame has a structure of a second legacy frame. The conflict response frame includes a third address field containing a first value that is equal to a second value contained in the second address field, and a second Duration field including a third value that is equal to a fourth value included in a first Duration field of the conflict query frame minus a sum of a duration of the conflict response frame and a duration of a short inter-frame space.

In accordance with another example embodiment of the present disclosure, a method for operating a first IEEE 802.11 compliant device is provided. The method includes transmitting a Request-to-Send frame including a first Receiver Address field containing a first locally assigned identifier associated with the first IEEE 802.11 compliant device, wherein the Request-to-Send frame also includes a Transmitter Address field, and determining if a Clear-to-Send frame corresponding to the Request-to-Send frame is received within a specified time interval after transmitting the Request-to-Send frame, wherein the Clear-to-Send frame includes a second Receiver Address field containing a first value that is equal to a second value contained in the Transmitter Address field. The method also includes discontinuing use of the first locally assigned identifier if the Clear-to-Send frame corresponding to the Request-to-Send frame is received within the specified time interval, and continuing use of the first locally assigned identifier if the Clear-to-Send frame corresponding to the Request-to-Send frame is not received within the specified time interval.

In accordance with another example embodiment of the present disclosure, a method for operating a second IEEE 802.11 compliant device is provided. The method includes receiving a Request-to-Send frame including a first Duration field, a first Receiver Address field, and a Transmitter Address field, and determining if the Request-to-Send frame is for testing potential conflict with a first locally assigned identifier associated with a first IEEE 802.11 compliant device, wherein the first locally assigned identifier is contained in the first Receiver Address field. The method also includes determining if the first locally assigned identifier matches a second locally assigned identifier associated with the second IEEE 802.11 compliant device, in response to determining that the Request-to-Send frame is for testing potential conflict, and transmitting a Clear-to-Send frame, beginning at a specified time, in response to determining that the first locally assigned identifier matches the second locally assigned identifier. The Clear-to-Send frame includes a second Receiver Address field containing a first value that is equal to a second value contained in the Transmitter Address field, and a second Duration field including a third value that is equal to a fourth value included in the first Duration field minus a sum of a duration of the Clear-to-Send frame and a duration of a short inter-frame space.

In accordance with another example embodiment of the present disclosure, a device is provided. The device includes a transmitter, a receiver, and a processor operatively coupled to the transmitter and to the receiver. The transmitter transmits a conflict query frame including a first address field containing a locally assigned identifier associated with the device, wherein the conflict query frame further includes a second address field and has a structure of a first legacy frame. The receiver receives frames. The processor determines if a conflict notification corresponding to the conflict query frame is received within a specified time interval after transmitting the conflict query frame, discontinues use of the locally assigned identifier if the conflict notification is received within the specified time interval, and continues use of the locally assigned identifier if the conflict notification is not received within the specified time interval.

In accordance with another example embodiment of the present disclosure, a device is provided. The second device includes a receiver, a processor operatively coupled to the receiver, and a transmitter operatively coupled to the processor. The receiver receives a conflict query frame including a first address field containing a first locally assigned identifier associated with a first device, wherein the conflict query frame further includes a second address field and has a structure of a first legacy frame. The processor determines if the first locally assigned identifier matches a second locally assigned identifier associated with the second device. The transmitter transmits a conflict response frame, beginning at a specified time, in response to determining that the first locally assigned identifier matches the second locally assigned identifier, wherein the conflict response frame has a structure of a second legacy frame. The conflict response frame includes a third address field containing a first value that is equal to a second value contained in the second address field, and a second Duration field including a third value that is equal to a fourth value included in a first Duration field of the conflict query frame minus a sum of a duration of the conflict response frame and a duration of a short inter-frame space.

One advantage of an embodiment is that conflicts, such as in addresses and/or identifiers, may be readily detected and resolved.

A further advantage of an embodiment is that the techniques presented herein are compatible with legacy devices.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to detecting and resolving conflicts of identifiers that are assigned to different communications stations in a distributed or uncoordinated manner. For example, a first device transmits a conflict query frame including a locally assigned identifier associated with the first device in a first address field of the conflict query frame, discontinues use of the locally assigned identifier in response to determining that a conflict notification corresponding to the conflict query frame is received within a specified time interval after transmitting the conflict query frame, and continues use of the locally assigned identifier in response to determining that the conflict notification corresponding to the conflict query frame is not received within the specified time interval.

The present disclosure will be described with respect to example embodiments in a specific context, namely IEEE 802.11 compliant communications systems that support neighbor awareness networking (NAN) protocols. The disclosure may be applied to standards compliant communications systems, such as those that are compliant with Third Generation Partnership Project (3GPP), IEEE 802.11, WiFi Alliance, and the like, technical standards, and non-standards compliant communications systems, that neighbor awareness networking or similar protocols.

Figure 1:
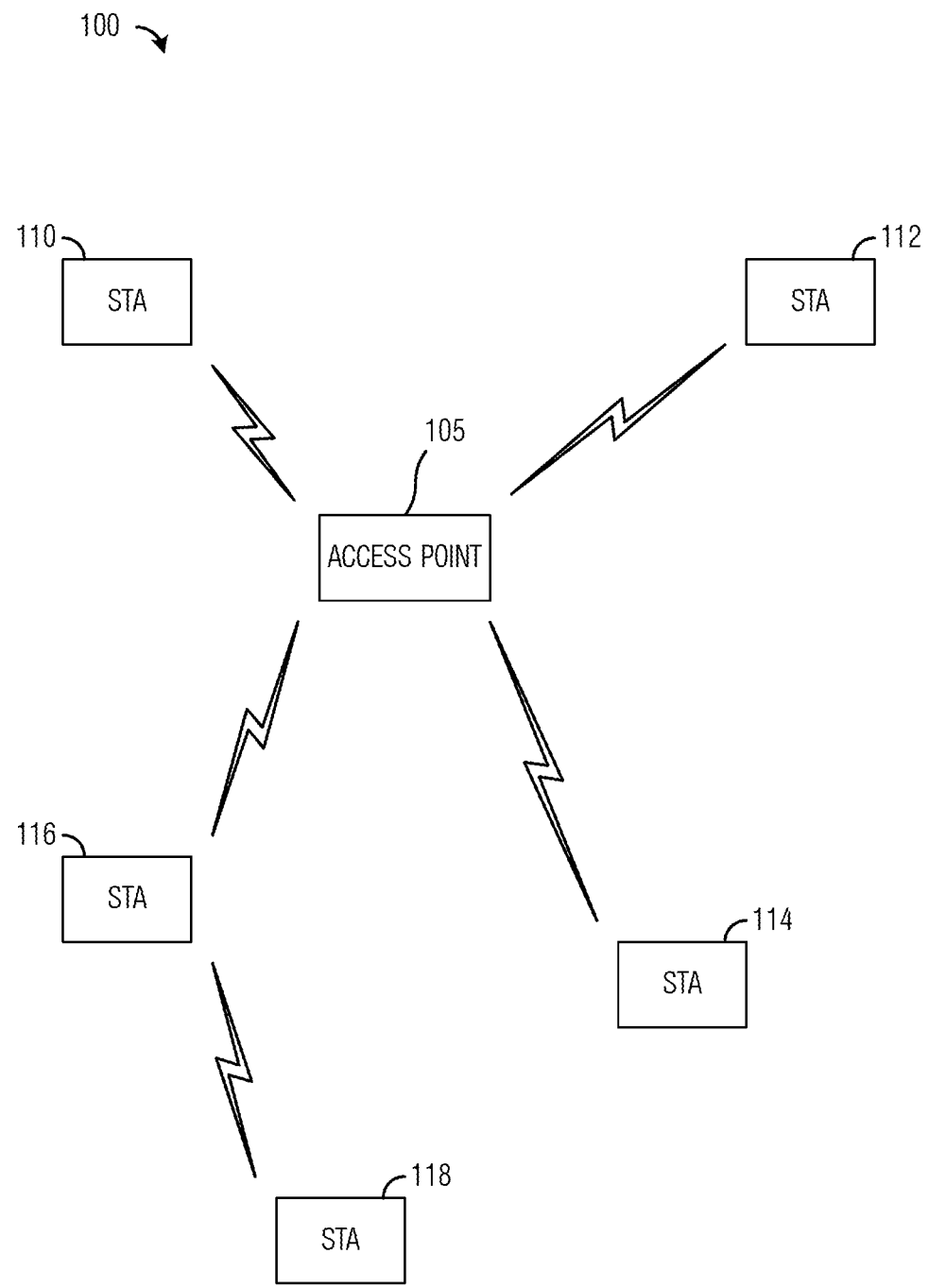
FIG. 1 illustrates an example communications system according to example embodiments described herein.

FIG. 1 illustrates an example communications system 100. Communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. APs may also be commonly referred to as NodeBs, evolved NodeBs (eNBs), base stations, controllers, communications controllers, and the like. Stations may also be commonly referred to as mobile stations, mobiles, user equipment (UE), terminals, users, subscribers, and the like.

While it is understood that communications systems may employ multiple APs capable of communicating with a number of stations, only one AP, and a number of stations are illustrated for simplicity.

In Wi-Fi systems, transmissions to and/or from a station occur on a shared wireless channel. Wi-Fi systems make use of carrier sense multiple access with collision avoidance (CSMA/CA), where a station desiring to transmit needs to determine that the wireless channel is idle before it can transmit. The use of CSMA/CA helps to reduce the collision probability between transmissions from multiple Wi-Fi devices, which are also known as stations (STAs) or simply devices. A station may determine the state of the wireless channel using the station's transmitter status, and both the physical and virtual carrier sense (CS) functions. When either CS function indicates that the wireless channel is busy or when the station is transmitting, the wireless channel is considered busy; otherwise, the wireless channel is considered idle. The physical CS function is provided by the physical layer using carrier sense/clear channel assessment (CS/CCA) procedure, which basically involves measuring the received radio frequency (RF) energy on a selected channel and comparing it with a CCA threshold. The CS/CCA procedure returns an indication of either busy or idle on the measured channel based on the result of the comparison. The virtual CS function is provided by the media access control (MAC) layer using a network allocation vector (NAV). NAV is an indicator, maintained by each station, of time periods when transmission onto the wireless channel is not initiated by the station. A station receiving a valid frame where the value in the Address 1 field, which is also known as the Receiver Address (RA) field, in the MAC header of the frame is not the MAC address of the station should update its NAV with the value received in the Duration field in the MAC header of the frame. The NAV may be thought of as a counter, which counts down to 0 at a uniform rate. When the counter is 0, the virtual CS function indicates that the wireless channel is idle; when nonzero, the wireless channel is busy.

Figure 2:
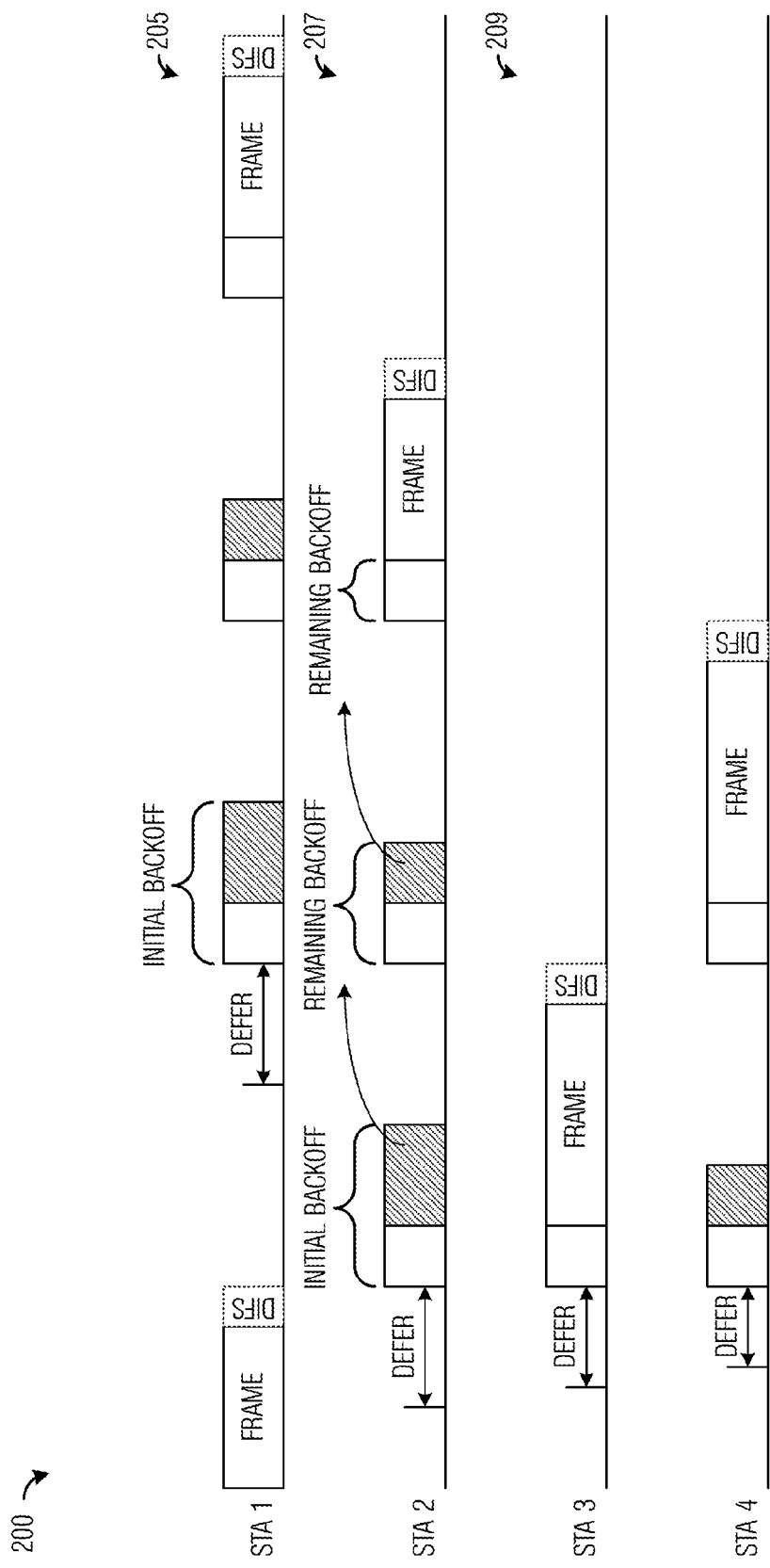
FIG. 2 illustrates a diagram of example channel access timing according to example embodiments described herein.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). At the end of a frame, each station wishing to transmit determines that the wireless channel is idle through the use of the CS functions over a time interval referred to as an inter-frame space (IFS). Different IFSs are defined to provide priority levels for access to the wireless channel. A short inter-frame space (SIFS) is the shortest of the IFSs between transmissions from different stations. A SIFS is usually used between the RTS frame and corresponding CTS frame, or between the data frame and corresponding ACK frame, without using a backoff period. A point coordination function (PCF) inter-frame space (PIFS) is used, usually by an AP, to gain priority access to the wireless channel for transmitting certain types of management frames, without using a backoff period. A distributed coordination function (DCF) inter-frame space (DIFS) may last longer than both the SIFS and the PIFS. A station desiring to initiate the transmission of a data frame should invoke the CS functions to determine that the wireless channel is idle for a period of DIFS. After the channel is idle for a period of DIFS, the station generates a random backoff period for additional deferral time before transmitting. This random backoff process minimizes the chances of collisions during contention between multiple stations that have been deferring to the same event.

Figure 3:
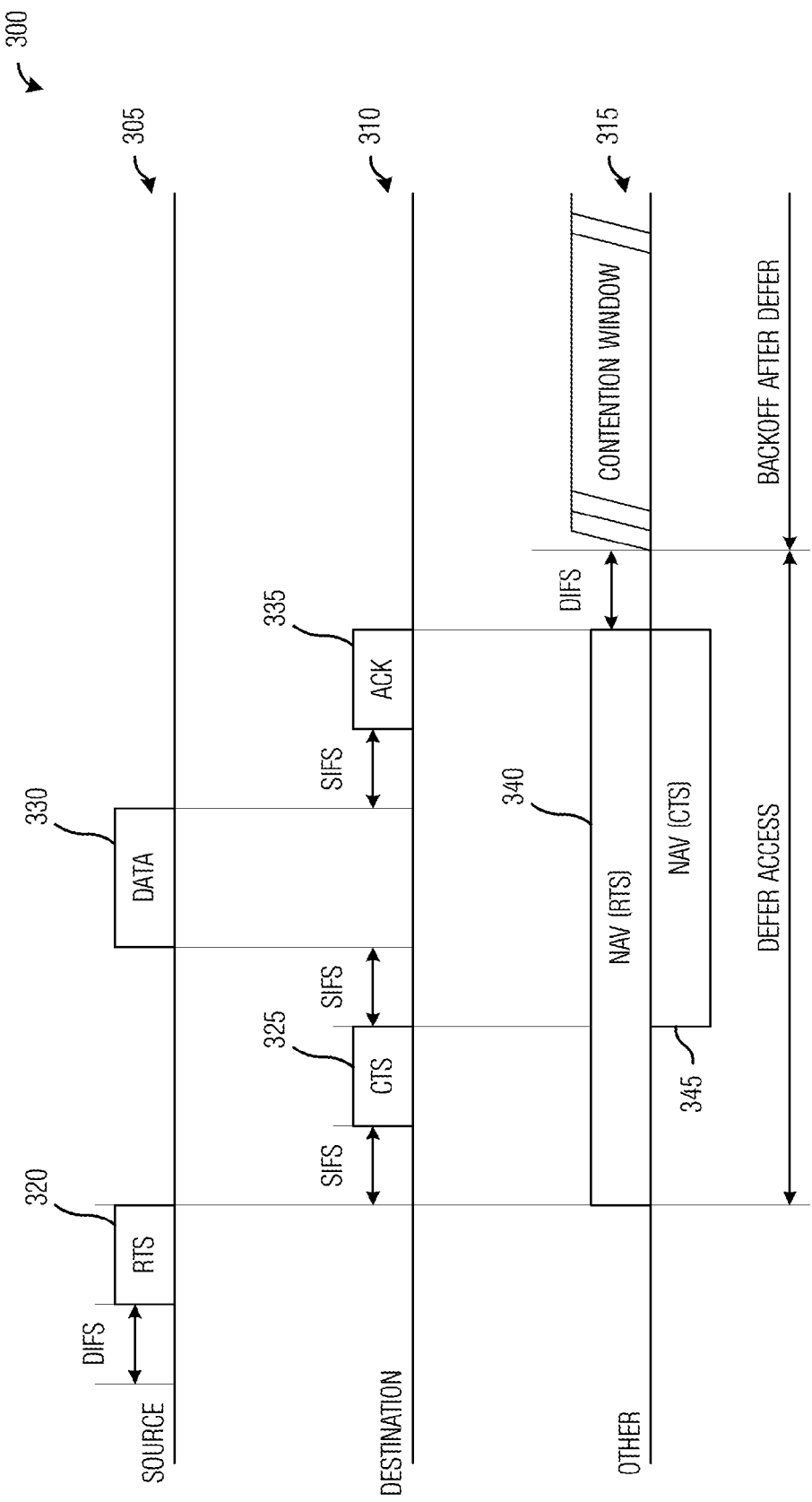
FIG. 3 illustrates a transmission diagram of example transmissions and states made by devices utilizing request-to-send (RTS) and clear-to-send (CTS) frames to reserve the wireless channel prior to the actual data transmission according to example embodiments described herein.

However, collisions may still happen, especially when there is a hidden node in the system. When a collision does happen between large data frames, a large chunk of air time may be wasted as the collided frames may not be received correctly and retransmission(s) is made. FIG. 3 illustrates a transmission diagram 300 of example transmissions and states made by devices utilizing request-to-send (RTS) and clear-to-send (CTS) frames to reserve the wireless channel prior to the actual data transmission. A first trace 305 illustrates transmissions made by a source device, a second trace 310 illustrates transmissions made by a destination device, and a third trace 315 illustrates states of other devices. In addition to CSMA/CA, the RTS and/or CTS frames may be used to reserve the wireless medium for transmission of large frame(s) to avoid excessive loss of air time if a collision happens. A Duration field in the RTS frame and CTS frame is set to a value that protects up to the end of a wireless medium reservation period which covers the anticipated CTS frame (for RTS frame only), the pending data frame transmission, the anticipated acknowledge (ACK) frame for acknowledging the data frame, and the SIFSs required between the frames. A third-party device receiving the RTS or CTS frame uses the Duration value to set its network allocation vector (NAV) to avoid contending for the wireless medium during the reserved period. With the RTS/CTS reservation mechanism, even if a collision happens due to the hidden node, the air time lost is much smaller since the RTS/CTS frames are usually much smaller than the data frames.

As shown in FIG. 3, after a DIFS period, the source device may transmit an RTS frame 320. RTS frame 320 may be addressed to the destination device and include a Duration field set to a value that covers to the end of a wireless medium reservation period, including an anticipated CTS frame, data frame, acknowledgement frame, and associated SIFS periods. RTS frame 320 may also include a MAC address of the source device in a transmitter address (TA) field of RTS frame 320. The destination device, after receiving RTS frame 320 may respond with a CTS frame 325 after waiting a SIFS period. CTS frame 325 may acknowledge that the source device is clear to transmit, which it does (a data frame 330) after another SIFS period. CTS frame 325 may be addressed to the source device by including the MAC address of the source device, which is obtained from the TA field of RTS frame 320, in a receiver address (RA) field of the CTS frame 325. Furthermore, CTS frame 325 may include a Duration field set to a value that covers to the end of a wireless medium reservation period by setting the value in the Duration field of CTS frame 325 to the value in the Duration field of the RTS frame 320 minus a sum of a duration of the CTS frame 325 and a duration of a SIFT. After receiving the CTS frame 325 corresponding to the RTS frame 320 (meaning the RA in the received CTS frame matches or is equal to the TA in the transmitted RTS frame), the source device may transmit the data frame 330 to the destination device after yet another SIFS period. After receiving the data frame 330, the destination device may transmit an acknowledgement frame 335 after yet another SIFS period.

The other devices that receive RTS frame 320 may set their NAV in accordance with a Duration field of RTS frame 320 (shown as NAV 340). Similarly, the other devices that receive CTS frame 325 may set their NAV in accordance with a Duration field of CTS frame 325 (shown as NAV 345). It is noted that although RTS frame 320 and CTS frame 325 may be received at different times, due to the different values of the Duration fields, the ends of the wireless medium reservation periods in the NAV occur at substantially the same time. The devices may contend for access to the wireless medium after a DIFS period.

Figure 4A:
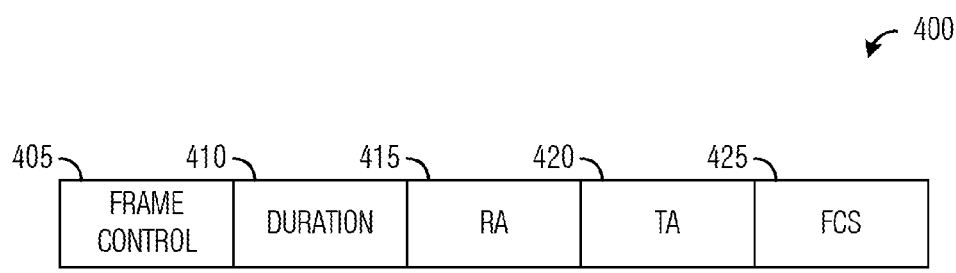
FIG. 4a illustrates an example RTS frame.

FIG. 4a illustrates an example RTS frame 400. RTS frame 400 may include a frame control field 405, a Duration field 410, a receiver address (RA) field 415, a transmitter address (TA) field 420, and a frame check sequence (FCS) field 425. Frame control field 405 may include control information, including a Type field and a Subtype field indicating that the frame is an RTS frame. Duration field 410 may specify a duration of a wireless medium reservation period, starting from the end of the RTS frame. RA field 415, also referred to as the Address 1 field, may specify a MAC address of an intended receiving device of RTS frame 400. TA field 415, also referred to as the Address 2 field, may specify a MAC address of a source device of RTS frame 400. FCS field 425 may include a cyclic redundancy check value for RTS frame 400.

Figure 4B:
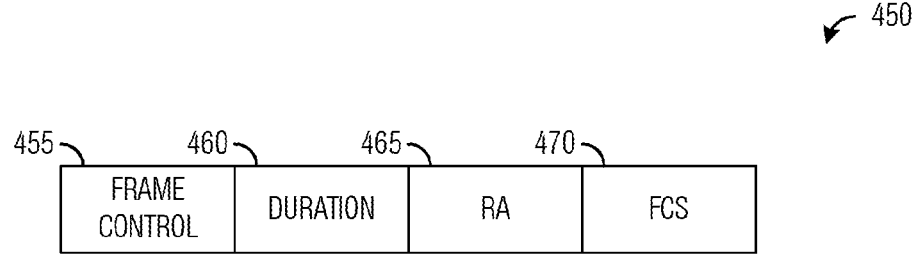
FIG. 4b illustrates an example CTS frame.

FIG. 4b illustrates an example CTS frame 450. CTS frame 450 may include a frame control field 455, a Duration field 460, an RA field 465, and a FCS field 470. Frame control field 455 may include control information, including a Type field and a Subtype field indicating that the frame is a CTS frame. Duration field 460 may specify a duration of a wireless medium reservation period, starting from the end of the CTS frame. RA field 465 may specify a MAC address of an intended receiving device of CTS frame 450. FCS field 470 may include a cyclic redundancy check value for CTS frame 450.

Figure 5:
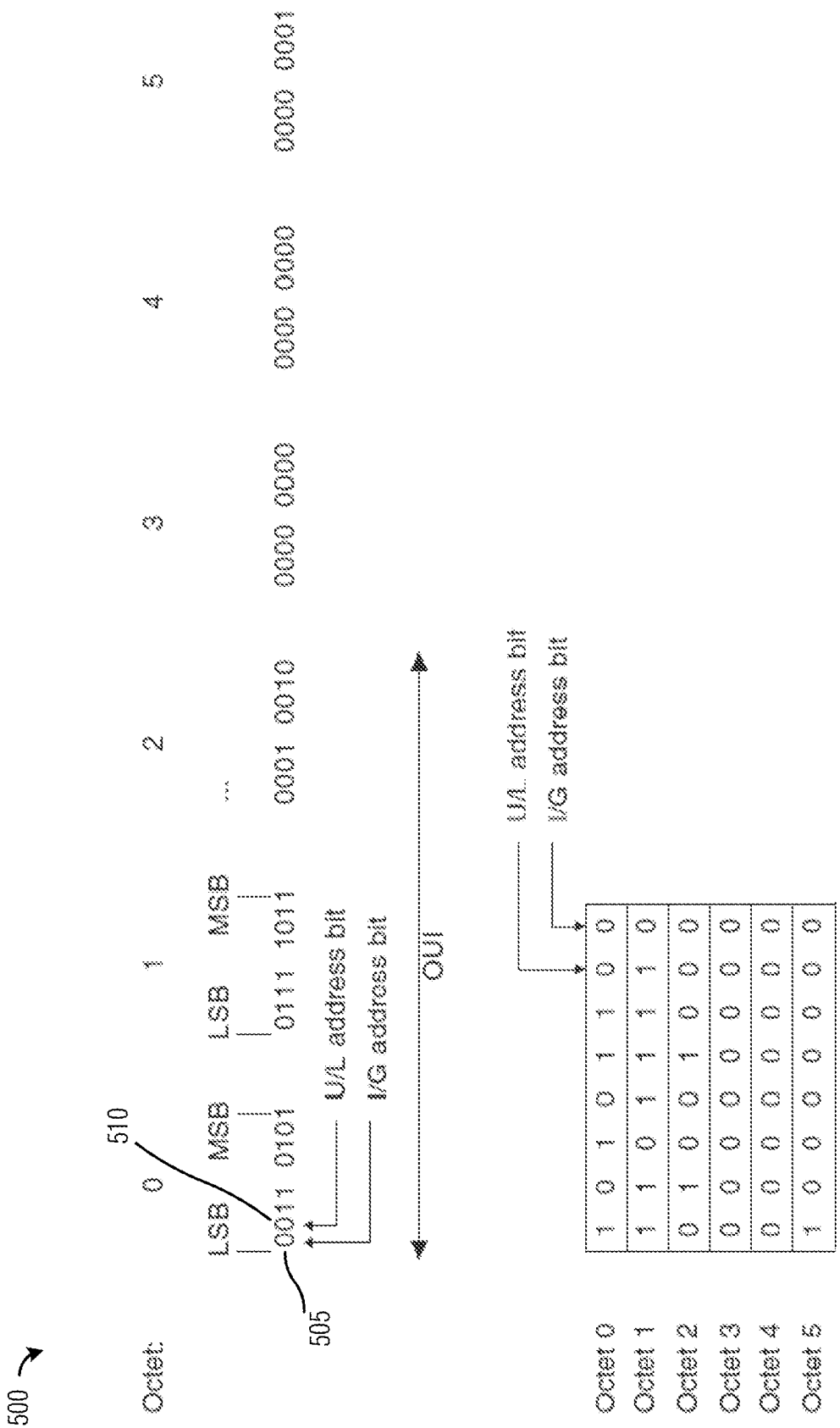
FIG. 5 illustrates an example MAC address.

In a NAN compliant communications system, a NAN-capable Wi-Fi device (or NAN device) can be identified by its MAC address. In a Wi-Fi system, a MAC address is a 6-octet long MAC Layer identifier of a device. FIG. 5 illustrates an example MAC address 500. As shown in FIG. 5, a least significant bit (LSB) 505 of Octet 0 of 6-octet long MAC Address 500, may be referred to as an Individual/Group (I/G) address bit, indicates if MAC address 500 is an individual MAC address or a group MAC address. A bit 510 next to the LSB of Octet 0 of 6-octet long MAC Address 500, may be referred to as a Universal/Local (U/L) address bit, indicates if MAC address 500 is a globally unique MAC address (which may also be referred to as a hardware MAC address) or a locally assigned MAC address.

A MAC address may be carried in the RA field, which is also referred to as an Address 1 field, of a MAC header of a frame to identify the intended recipient of the frame. A MAC address may be carried in the TA field, which is also referred to as an Address 2 field, of the MAC header of a frame to identify the transmitting device of the frame.

Furthermore, in a NAN compliant communications system, a NAN group is identified by a NAN Cluster ID, which is 6-octect long (same as the MAC address). It has been proposed that a NAN Cluster ID can only take a value (with hexadecimal representation) from 50-6F-9A-<TBD>-00-00 to 50-6F-9A-<TBD>-FF-FF, thereby only allowing 65536 possible NAN Cluster IDs. The value of Octet 3 of the NAN Cluster ID is to be decided (TBD) by the standard body. The NAN Cluster ID of a NAN group is generally randomly chosen from within the allowed range at the start of the NAN group by the device that initiates the NAN group.

Generally, in a service oriented computing system or communications system, a service that is being advertised or sought may be identified by a service name. In Wi-Fi Alliance's (WFA's) Wi-Fi Direct Services (WFDS) specification project, a Service ID (or Service Hash), which is a 6-octet-long truncated hash output of the service name, is used to identify the service in the very first message frame (Probe Request frame). Then the service name is used in the subsequent message frames.

The NAN protocol places privacy protection high on a list of priorities. The globally unique MAC address of a device, if revealed in a frame that the device sends, for example, in the TA field of the frame, may be used by others to identify the device and/or to track the movement of the device, thereby the movement of the user of the device. One of the ways that privacy is protected is that the MAC address used in the frames sent by a NAN compliant device during a pre-association service discovery phase may be a local and/or temporary MAC address that the NAN compliant device generates, for example, randomly, and assigns to itself. The NAN compliant device's globally unique (and permanent) MAC address may be used only when a connection is needed or only after a security protection mechanism (such as a shared encryption key) has been established. In such a situation, there is a small (but non-zero) chance that the local MAC address that the NAN compliant device assigns to itself may conflict with (i.e., happen to be the same as) a MAC address already being used by another NAN compliant device or a legacy device. Furthermore, a NAN cluster identifier (a NAN cluster ID) is also randomly chosen from within a limited range in a distributed manner by an organizer of a NAN group. Hence, in a high density environment, the NAN cluster identifiers of different NAN groups may also conflict. Such a conflict of identifiers may cause protocol errors and compromise the system robustness.

In a more general case, in any future evolution of 802.11/Wi-Fi technology, it may become desirable to provide privacy protection by using a locally generated identifier of a device for identifying the device at the MAC layer level, and this locally generated identifier is always decoupled from the globally unique MAC address or any upper layer identifier of the device that may reveal the true identity of the device or the end user. In those circumstances, especially in high-density environments, a conflict of locally generated identifiers between different devices may occur and may cause protocol errors. Thus, a mechanism to detect and resolve such conflicts is needed.

According to an example embodiment, MAC layer frames may be used to detect a potential conflict of identifier. As an illustrative example, a Conflict Query frame and a Conflict Response frame may be used to detect a potential conflict of identifier. As another illustrative example for detecting a potential conflict of identifier, in an IEEE 802.11 or WFA compliant communications system, the RTS frame may be reused as the Conflict Query frame such that the Conflict Query frame has not only the same structure of the RTS frame but also the same values in the Type and Subtype fields as those in the RTS frame, and the CTS frame may be reused as the Conflict Response frame such that the Conflict Response frame has not only the same structure of the CTS frame, but also the same values in the Type and Subtype fields as those in the CTS frame. As yet another illustrative example for detecting a potential conflict of identifier, in an IEEE 802.11 or WFA compliant communications system, the RTS frame may be reused as the Conflict Query frame such that the Conflict Query frame has not only the same structure of the RTS frame but also the same values in the Type and Subtype fields as those in the RTS frame, while the Conflict Response frame has the same structure of the CTS frame but has a different value in the Type or Subtype field as that in the CTS frame to indicate that the Conflict Response frame is different from the CTS frame. The RTS and CTS frames may be used in such a way that preserves backwards compatibility with legacy devices. A significance of reusing the RTS and CTS frames is that a legacy device can react to the RTS-like Conflict Query frame and the CTS-like Conflict Response frame properly based on the legacy rules of behaviors, and more importantly, if a conflict with a MAC address of a legacy device exists, reusing the RTS frame as the Conflict Query frame enables the legacy device to send a response to the Conflict Query frame based on the legacy rules of behavior and the response will be interpreted as a notification of a conflict, as a Conflict Response frame is, by the initiating device of the Conflict Query frame.

According to an example embodiment, a NAN compliant device may transmit a MAC layer frame used for conflict query, such as a Conflict Query frame, a RTS frame, and the like, to test the existence of a candidate identifier, such as a MAC address, a NAN cluster identifier, a service identifier, a group identifier, and the like, before adopting the use of the candidate identifier or when the NAN compliant device suspects that there has been a conflict with the identifier that it is using. Such a frame may be referred to in general as a conflict query frame. A cause of suspecting a conflict with an identifier being used may be an unusually high rate of protocol errors, higher layer data errors or decryption failures in spite of a high rate of success in decoding the MAC layer frames. In general, conflicts of identifiers that are assigned in a distributed or un-coordinated manner may be checked using the example embodiments disclosed herein. As an illustrative example, the conflict query frame may reuse the frame structure of a RTS frame (shown in FIG. 4a). In the conflict query frame, a frame control field may further be set identical to the one in a conventional RTS frame that is sent to reserve the wireless medium for data transmission, meaning that frame type and subtype fields in the frame control field indicate that the conflict query frame is an RTS frame. Identifying the conflict query frame as an RTS frame is for compatibility reasons and to allow legacy devices to possibly participate in sending a conflict notification.

A Duration field in the conflict query frame may be used to set the NAV of non-responding stations to a value that covers to the end of an anticipated MAC layer frame used for conflict response or Conflict Response frame, which has the frame structure of a CTS frame (shown in FIG. 4b), so there is no pending data frame or acknowledgement (ACK) frame. Such a Duration value is a fixed value since the lengths of the Conflict Response frame and the SIFS gap are fixed. And such a Duration value is generally shorter than a typical Duration value in a conventional RTS frame when a pending data frame and ACK frame normally follow. The MAC layer frame used for conflict response or Conflict Response frame may be referred to as a conflict response frame. The untypical value in the Duration field of a conflict query frame may be used by the NAN compliant devices to differentiate the conflict query frame from a conventional RTS frame. With the frame differentiated (either as the conflict query frame, or the conventional RTS frame), the NAN compliant device may interpret the remaining fields of the frame according to the differentiation.

An Address 1 field, which is also known as the receiver address (RA) field, of the conflict query frame may be set to the candidate identifier, such as the candidate local MAC address, the candidate NAN cluster ID, the candidate service identifier, the candidate group identifier, and the like, of the NAN compliant device transmitting the conflict query frame instead of the globally unique MAC address of an intended receiving device as in a conventional RTS frame. An Address 2 field, which is also known as the transmitter address (TA) field, of the conflict query frame may be set to the candidate identifier of the NAN compliant device transmitting the conflict query frame as well. As an illustrative example, consider a situation wherein candidate local MAC addresses are being tested for conflict. Since the NAN compliant does not yet have a MAC address (a non-permanent local MAC address), it is natural to use the candidate local MAC address as the transmitter address in the Address 2 field. It is noted that setting the Address 1 field and the Address 2 field to the same value may be used to facilitate another technique to differentiate the conflict query frame from a conventional RTS frame, or to eliminate possible erroneous frames.

According to an example embodiment, when a NAN compliant device receives the conflict query frame testing a candidate identifier that matches with a local identifier of the NAN compliant device, the NAN compliant device may send back a conflict response frame, and the like, to notify of or indicate the existence of a conflict with the candidate identifier. As an illustrative example, the conflict response frame may reuse the frame structure of a CTS frame (shown in FIG. 4b). In the conflict response frame, a frame control field may further be set to be identical to the one in a conventional CTS frame, meaning that frame type and subtype fields in the frame control field indicate that the conflict response frame is a CTS frame. Identifying the conflict response frame as a CTS frame is for compatibility reasons.

As in the RTS and CTS frames, a Duration field in the conflict response frame may be set to the value obtained from the Duration field of the corresponding conflict query frame subtracted by the sum of durations of the conflict response frame and of a SIFT, so that values in both Durations fields cover to the same end of the wireless medium reservation period. As a result, if the Duration field in the corresponding conflict query frame is set to a value that equals to the sum of durations of the conflict response frame and of a SIFT, the Duration field in the conflict response frame is set to zero, meaning that the wireless medium will be free at the end of the conflict response frame (for no data frame nor ACK frame follows). Such an untypical value in the Duration field of the conflict response frame may be used to differentiate the conflict response frame from a conventional CTS frame that is normally followed by a data frame and ACK frame. An Address 1 field of the conflict response frame may be set to the same value as the Address 2 field in the corresponding conflict query frame. This is also consistent with technical standards requirements that the Address 1 field in a first frame sent in response to a second frame is the same as the Address 2 field of the second frame.

A legacy device that receives an RTS-frame-based conflict query frame may determine that it is a RTS frame, since the Type and Subtype fields in the frame control field of the conflict query frame indicate so. If a MAC address of the legacy device matches with the value in the Address 1 field of the RTS-frame-based conflict query frame (which carries the candidate identifier being tested), the legacy device may send back a CTS frame with the Duration field set to the value of the Duration field of the received conflict query frame subtracted by the sum of durations of a CTS frame and of a short inter-frame space. This is based on the legacy rules of behavior when sending a CTS frame in response to receiving an RTS frame. This legacy behavior ensures that the Duration field in the CTS frame has a consistent end of wireless medium protection coverage as that of the Duration field of the frame causing the CTS frame. Because the Duration field in the received conflict query frame has a value that equals to the sum of durations of a conflict response frame, which has the same duration as a CTS frame for having the same structure of, and of a short inter-frame space, the subtraction causes the Duration field in the CTS frame sent to be zero (i.e., the wireless medium becomes free at the end of the CTS frame). The CTS frame sent by the legacy device also includes the RA field with value set to the content of the Address 2 field of the seemingly RTS frame (but actually a conflict query frame) received by the legacy device. This is also based on the legacy rules of behavior when sending a CTS frame in response to receiving a RTS frame. If the MAC address of the legacy device does not match with the value in the Address 1 field of the conflict query frame, the legacy device may set its NAV according to the value of the Duration field of the conflict query frame, which is up to the end of the conflict response frame. Therefore, the legacy device may return to contending for the communications medium after the conflict response frame and loses no time.

In general, when a first NAN compliant device that is an originator of the conflict query frame, receives either a conflict response frame from a second NAN compliant device or a CTS frame from a legacy device, the first NAN compliant device may deem that there is a conflict with the candidate identifier included in the conflict query frame. On the other hand, receiving no conflict response frame or CTS frame within a pre-defined responding time may be an indication that there is no conflict. As a result of detecting a conflict, the first NAN compliant device may decide to try another candidate identifier in an attempt to resolve the identifier conflict. To do so, the first NAN compliant device may select a new candidate identifier and send a new conflict query frame with the new candidate identifier stored in the Address 1 and Address 2 fields. If the first NAN compliant device receives no conflict response frame or CTS frame corresponding to the new conflict query frame, the first NAN compliant device may deem that there is no conflict related to the new candidate identifier and may commence using the new candidate identifier. It is noted that response timing of the conflict response frame to the conflict query frame is substantially the same as that of a conventional CTS frame to a conventional RTS frame, which is fixed and short, thereby helping the first NAN compliant device to quickly determine if there is a conflict with the candidate identifier(s).

In a situation where MAC layer frames used for conflict query and conflict response are used to detect multiple identifier conflicts, an identifier type field may be used to indicate which type of identifier is being checked. However, if the frame format of legacy frames, such as RTS and CTS frames, are used for the conflict query and conflict response, there may be a lack of space to add an identifier type field due to a need for backwards compatibility with the legacy RTS and CTS frames.

According to an example embodiment, if a NAN compliant device uses a first identifier, such as a locally assigned MAC address as its NAN Interface Address, the next-to-LSB of Octet 0 (i.e., the U/L address bit 510 of FIG. 5) of the 6-octet long MAC address must be "1". Since a globally assigned MAC address is always unique and never needs to be checked for conflict, if a conflict query frame is sent to test a candidate MAC address, it must be a local MAC address; therefore the next-to-LSB of Octet 0 (i.e., the U/L address bit 510) of the 6-octet value in Address 1 field is "1" if the candidate MAC address is being conveyed and tested.

It has been proposed to allocate the following range of basic service set identifiers (BSSID) (in hexadecimal form) for NAN cluster IDs: 50-6F-9A-<TBD>-00-00 to 50-6F-9A-<TBD>-FF-FF. Even though Octet 3 has not been determined yet, it is known that Octet 0 will always be "50" in hexadecimal notation, which is "00001010" in binary form, beginning with the LSB. This means that the next-to-LSB of Octet 0 of any NAN cluster ID must be "0", which is the opposite value of locally generated MAC addresses. This is consistent with the rule that WFA-specific Organizationally Unique Identifier (OUI) values (the first three octets of the NAN cluster IDs (i.e., "50-6F-9A")) are meant to be globally unique. Hence, the next-to-LSB of Octet 0 of the 6-octet value in the Address 1 field is "0" if the NAN cluster ID is being conveyed and tested.

Therefore, the next-to-LSB (i.e., the U/L address bit 510 of FIG. 5) of Octet 0 of the 6-octet value in the Address 1 field may be used as an indication if a local MAC address or NAN cluster ID is being tested. A NAN compliant device that is managing a NAN group, such as a NAN Anchor Master or a NAN Master, may use both its local MAC address and the NAN cluster ID of its NAN group to compare with the value in the Address 1 field of a conflict query frame. A NAN compliant device that is not managing a NAN group may not respond to a conflict query frame that is testing a NAN cluster ID to avoid too many NAN compliant devices responding to the same conflict query frame. Hence, NAN compliant devices not managing NAN groups may use their local MAC address to compare with the value in the Address 1 field of a conflict query frame without determining if the received frame is testing a local MAC address or a NAN cluster ID, since its own local MAC address will not match with a NAN cluster ID.

According to another example embodiment, the LSB (i.e., the I/G address bit 505 of FIG. 5) of Octet 0 of the 6-octet value in the RA field may be used to indicate if a candidate identifier is a local MAC address that is normally assigned to an individual device or a group identifier that will be assigned to a group of devices, as a group identifier should have the I/G address bit set to "1" while a local MAC address that is assigned to an individual device should have the I/G address bit set to "0".

Figure 6:
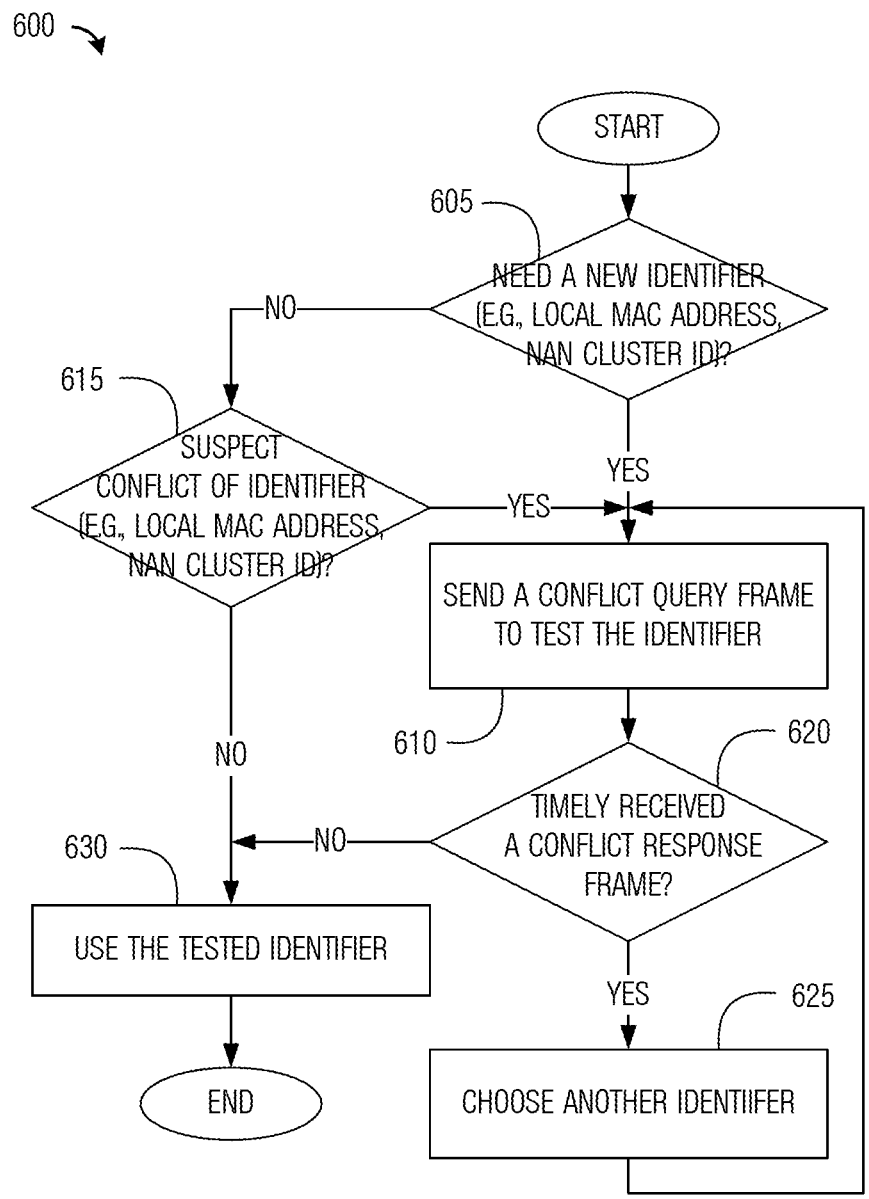
FIG. 6 illustrates a flow diagram of example operations occurring in a NAN compliant device as the NAN compliant device tests an identifier for conflict according to example embodiments described herein.

FIG. 6 illustrates a flow diagram of example operations 600 occurring in a NAN compliant device as the NAN compliant device tests an identifier for conflict. Operations 600 may be indicative of operations occurring in a NAN compliant device, such as eNB 105 or stations 110-118, as the NAN compliant tests an identifier for conflict.

Operations 600 may begin with the NAN compliant device performing a check to determine if it needs a new identifier, such as a local MAC address, NAN cluster ID, and the like (block 605). As an illustrative example, the NAN compliant device that is highly sensitive to a user's privacy may need a new local MAC address on occasion in order to avoid being tracked. As another illustrative example, the NAN compliant device initiating a NAN group may need a NAN Cluster ID. If the NAN compliant device determines that it needs a new identifier, the NAN compliant device may send a conflict query frame, such as a MAC frame used for conflict query, a Conflict Query frame, a repurposed RTS frame, and the like (block 610). The conflict query frame may include the identifier inserted in both the Address 1 and Address 2 fields, and a Duration field set to a value equal to the sum of the lengths, in time, of a Conflict Response frame and of a short inter-frame space (SIFS).

If the NAN compliant device determines that it does not need a new identifier, the NAN compliant device may perform a check to determine if it suspects a conflict of identifiers, such as a conflicting local MAC address, a conflicting NAN cluster ID, and the like (block 615). As an illustrative example, the NAN compliant device may receive data frames intended for it (i.e., the MAC address of the NAN compliant device matches the RA field of the received data frames) but it is unable to decrypt or otherwise parse the data frames of some or all of the received data frames. Such a situation may lead the NAN compliant device to suspect that there is another device with the same MAC address. If the NAN compliant device suspects that there is a conflict of identifiers, the NAN compliant device may send a conflict query frame (block 610) to confirm that.

The NAN compliant device may perform a check to determine if it has received a conflict response frame with a receiver address (i.e. the Address 1 field) matches with the candidate identifier that the NAN compliant device is testing, such as a MAC frame used for conflict response, a Conflict Response frame, a repurposed CTS frame, and the like, in a timely fashion (block 620). As an illustrative example, the NAN compliant device may expect to receive a conflict response frame within a small amount of time after a SIFS period. If the NAN compliant device does receive a conflict response frame matching to the conflict query frame in a timely manner, the NAN compliant device may select a new identifier, such as a new MAC address, a new NAN cluster ID, and the like (block 625). The NAN compliant device may return to block 610 to test the new identifier. If the NAN compliant device does not receive a conflict response frame matching to the conflict query frame in a timely manner, the NAN compliant device may deem that there is no conflict and use the identifier (block 630). Operations 600 may terminate. Similarly, if the NAN compliant device does not suspect a conflict of identifiers in block 615, the NAN compliant device may use the identifier (block 630).

According to an example embodiment, instead of routinely checking for a potential conflict with some identifiers, the NAN compliant device may use the identifier until it suspects that there is a conflict. Since the probability of an identifier conflict is relatively low (for some identifiers, such as MAC address) and using communications medium resources to continually check for potential conflicts, by transmitting conflict query frames, may end up wasting a lot of resources, the NAN compliant device may save significant communications resources if it uses the identifiers and perform a check for conflicts only if it suspects that there is a conflict. If the NAN compliant device suspects that there is a conflict, the NAN compliant device may use a conflict checking technique, such as the example embodiment disclosed in FIG. 6, to check the identifier for conflict.

According to an example embodiment, for identifiers that have relatively high probability of conflict (such as NAN cluster IDs), especially in high density environments, NAN compliant devices using the identifiers with high probability of conflict may use a conflict checking technique, such as the example embodiment disclosed in FIG. 6, to check the identifier for conflict prior to using the identifier. As an illustrative example, if the identifier is used as a NAN cluster ID, the NAN compliant device may use the example embodiment disclosed in FIG. 6, for example, to test a NAN cluster ID prior to using it to initiate a NAN group. It is noted that it is still possible for a conflict of NAN cluster IDs to occur even if the NAN cluster IDs are tested prior to use. In a situation when two independently initiated NAN groups with the same NAN cluster ID are remotely located and successfully initiated without conflict. When the two NAN groups subsequently moved close to one another, conflicts may arise. When a NAN compliant device(s) that is managing the NAN group(s) suspects a conflict, the NAN compliant device(s) may use the example embodiment disclosed in FIG. 6 to resolve the conflict.

Figure 7:
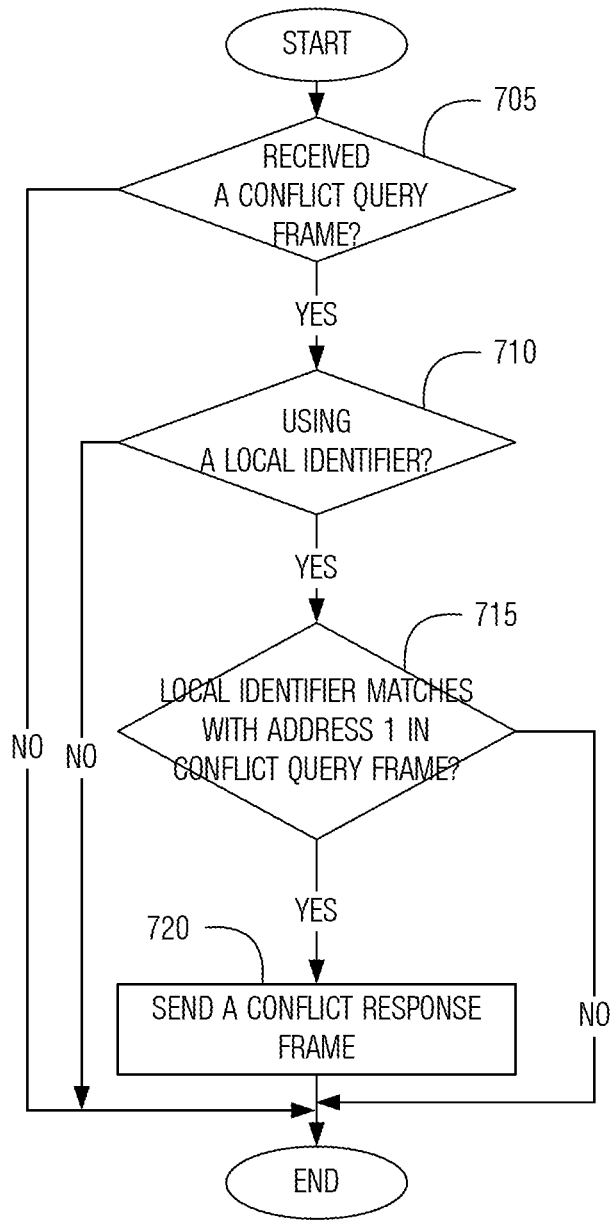
FIG. 7 illustrates a flow diagram of example operations occurring in a NAN compliant device as the NAN compliant device responds to a conflict query frame according to example embodiments described herein.

FIG. 7 illustrates a flow diagram of example operations 700 occurring in a NAN compliant device as the NAN compliant device responds to a conflict query frame. Operations 700 may be indicative of operations occurring in a NAN compliant device, such as eNB 105 or stations 110-118, as the NAN compliant device responds to a conflict query frame.

Operations 700 may begin with the NAN compliant device performing a check to determine if it has received a conflict query frame (block 705). The conflict query frame may be received from another NAN compliant device testing an identifier, such as a MAC address, a NAN cluster ID, and the like, for a conflict. If the NAN compliant device did not receive a conflict query frame, operations 700 may terminate. If the NAN compliant device received a conflict query frame, the NAN compliant device may also perform a check to determine if it is using a local identifier (block 710). In general, if the NAN compliant device is not using local identifiers, conflicts may not occur. As an illustrative example, if the identifier is a MAC address, then if local MAC addresses are not being used, then conflicts may not exist since global MAC addresses are unique by definition. If the NAN compliant device is not using local identifiers, operations 700 may terminate.

If the NAN compliant device is using local identifiers, the NAN compliant device may perform a check to determine if the local identifier matches with a value in an Address 1 field of the conflict query frame (block 715). If the local identifier does not match with the value in the Address 1 field, then there is not a conflict and operations 700 may terminate. It is noted that the NAN compliant device may compare the value in the Address 1 field against more than one local identifier to determine if there is a match. If there is a match, the NAN compliant device may send a conflict response frame with the local identifier stored in as a value in a RA field of the conflict response frame and with a Duration field set to zero (block 720). Operations 700 may terminate.

Figure 8:
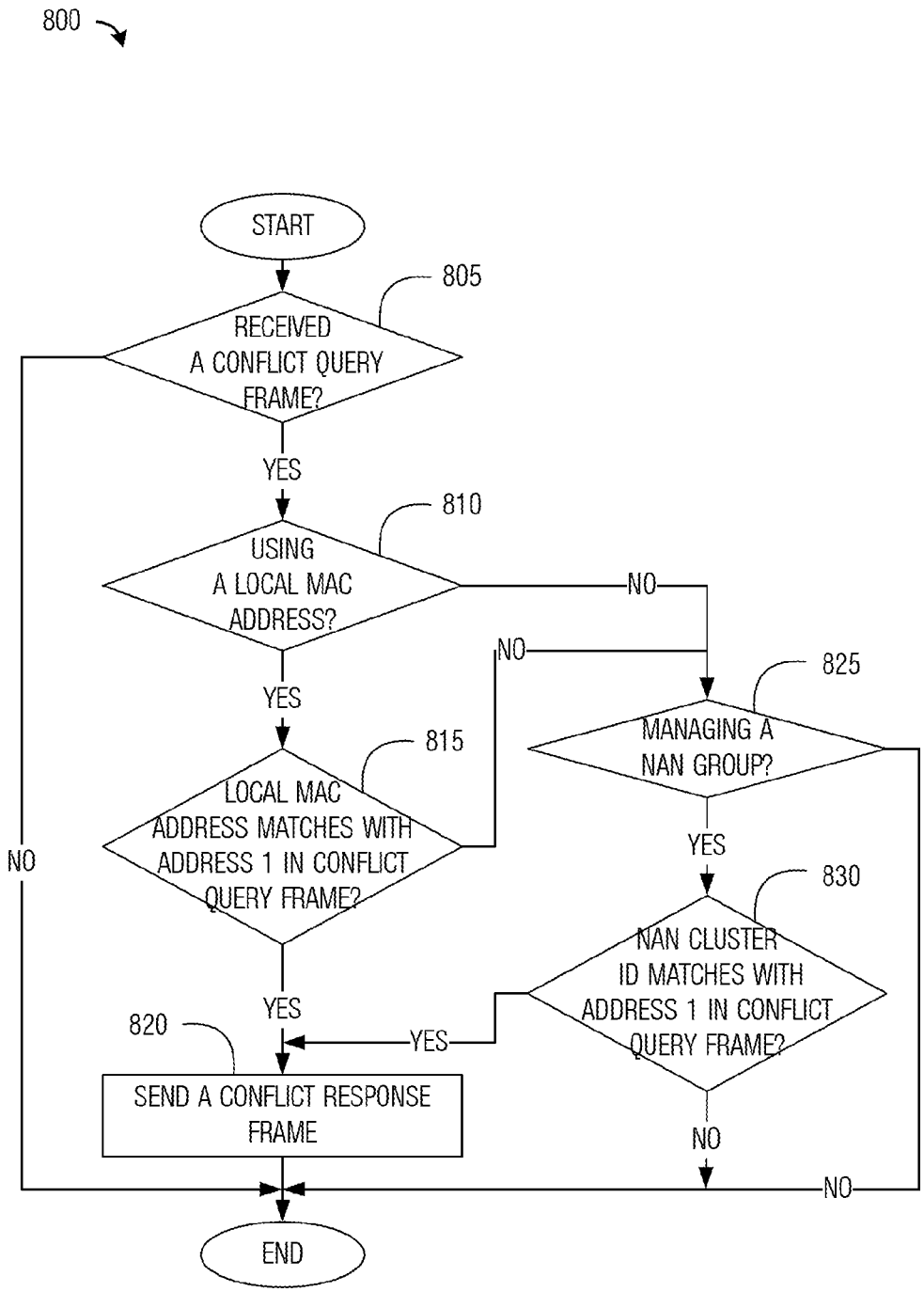
FIG. 8 illustrates a flow diagram of example operations occurring in a NAN compliant device as the NAN compliant device responds to a conflict query frame according to example embodiments described herein.

FIG. 8 illustrates a flow diagram of example operations 800 occurring in a NAN compliant device as the NAN compliant device responds to a conflict query frame, wherein the NAN compliant device is utilizing more than one local identifier. Operations 800 may be indicative of operations occurring in a NAN compliant device, such as eNB 105 or stations 110-118, as the NAN compliant responds to a conflict query frame, wherein the NAN compliant device is utilizing more than one local identifier.

Operations 800 may begin with the NAN compliant device performing a check to determine if it has received a conflict query frame (block 805). The conflict query frame may be received from another NAN compliant device testing an identifier, such as a MAC address, a NAN cluster ID, and the like, for a conflict. If the NAN compliant device did not receive a conflict query frame, operations 800 may terminate. The NAN compliant device may also perform a check to determine if it is using a local MAC address (block 810). If the NAN compliant device is using a local MAC address, the NAN compliant device may perform a check to determine if its local MAC address matches a value stored in an Address 1 field of the conflict query frame (block 815). If there is a match, the NAN compliant device may send a conflict response frame with the local MAC address stored in as a value in a RA field of the conflict response frame and with a Duration field set to zero (block 820). Operations 800 may terminate.

If there is not a match between the local MAC address and the value stored in the Address 1 field, or if the NAN compliant device is not using local MAC addresses, the NAN compliant device may perform a check to determine if it is managing a NAN group (block 825). If the NAN compliant device is not managing a NAN group, operations 800 may terminate. If the NAN compliant device is managing a NAN group, the NAN compliant device may perform a check to determine if a NAN cluster ID of a NAN group managed by the NAN compliant device matches with the value in the Address 1 field of the conflict query frame (block 830). If there is no match, operations 800 may terminate. If there is a match, the NAN compliant device may send a conflict response frame with the NAN cluster ID stored in as a value in a RA field of the conflict response frame and with a Duration field set to zero (block 820). Operations 800 may terminate.

It is noted that although the discussion of operations 800 focuses on local MAC addresses and NAN cluster IDs, operations 800 may be used to check other identifiers for conflicts. Therefore, the discussion of local MAC addresses and NAN cluster IDs should not be construed as being limiting to either the scope or the spirit of the example embodiments.

Example embodiments presented herein involve not only detecting and resolving conflicts of addresses or identifiers, but also doing so by reusing existing protocols and frame structures in a backward compatible way such that a communications system utilizing such embodiments can coexist with legacy communications systems and devices. In such a situation, in addition to WFA's NAN standards project, it is also possible to apply the concepts presented herein to other IEEE 802.11 based standards, such as the on-going IEEE 802.11aq Pre-Association Discovery project, WFA's Wi-Fi Direct Service (WFDS) project, WFA's Service Discovery project, and the like, since legacy RTS and CTS frames may be reused in such systems for detecting potential conflicts of MAC addresses and/or similar identifiers. A benefit of reusing legacy RTS and CTS frames as the Conflict Query and Conflict Response frames, respectively, is that they allow a legacy device to participate in detecting a conflict between its MAC address and the identifier being tested, and notifying the initiating device of such a conflict using the legacy frame and legacy rules of behaviors that it is made with. No hardware or software upgrade is required at the legacy device to do so. Actually, the legacy device is unaware of the new purpose of the seemingly RTS frame received. Comparatively, defining a new Conflict Query frame and Conflict Response frame with a frame type or subtype value that legacy devices don't understand would prevent them from participating in detecting and notifying of the conflict. In that case, although conflicts between NAN compliant devices can be detected and resolved, conflicts between a NAN complaint device and a legacy device may still exist and remain undetected. Therefore, in the case where it is desirable to detect a conflict with an identifier of legacy devices, reusing the legacy RTS and CTS frames as the Conflict Query and Conflict Response frames is preferred.

Additionally, the example embodiments presented herein may be used in any ad-hoc based communications system, to detect and resolve a Layer 2 address conflict without requiring the help of Layer 3 addresses, and doing so by reusing some existing Layer 2 message frames in a backward compatible manner so that an enhanced communications system can coexist with legacy communications systems and devices. Examples of such ad-hoc based communications systems include those based on IEEE 802.15, Bluetooth, ZigBee, and the like.

Figure 9:
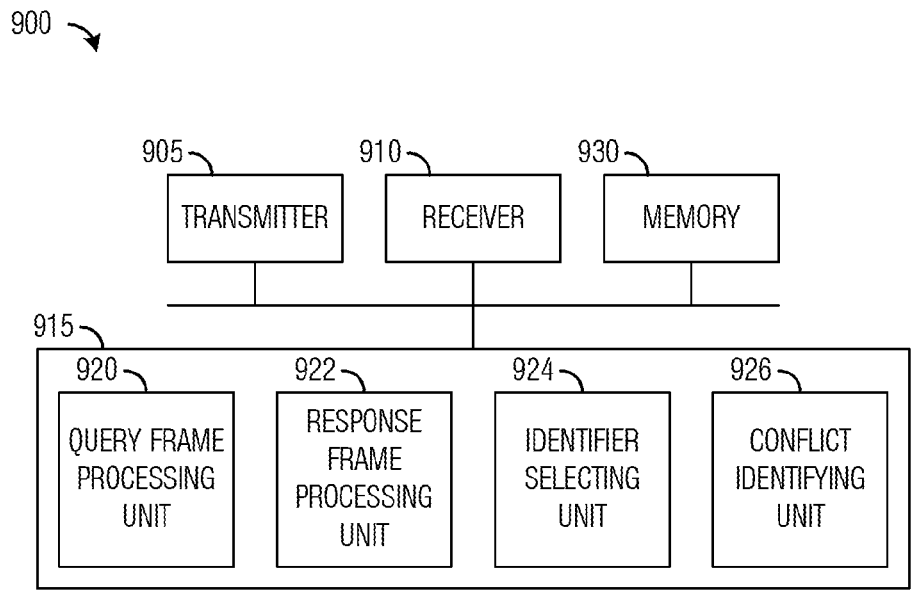
FIG. 9 illustrates an example first communications device according to example embodiments described herein.

FIG. 9 illustrates an example first communications device 900. Communications device 900 may be an implementation of a NAN compliant transmitting device, such as a communications controller, such as an eNB, a base station, a NodeB, a controller, and the like, or a UE, such as a user, a subscriber, a terminal, a mobile, a mobile station, and the like. Communications device 900 may be used to implement various ones of the embodiments discussed herein. As shown in FIG. 9, a transmitter 905 is configured to transmit frames, conflict query frames, and the like. Communications device 900 also includes a receiver 910 that is configured to receive frames, conflict response frames, and the like.

A query frame processing unit 920 is configured to generate a conflict query frame, such as a Conflict Query frame, a RTS frame, and the like. Query frame processing unit 920 is configured to insert an identifier to be tested in both an Address 1 field and an Address 2 field of the conflict query frame. A response frame processing unit 922 is configured to process a received conflict response frame, such as a Conflict Response frame, a CTS frame, and the like. Response frame processing unit 922 is configured to determine that an identifier to be tested does conflict with an identifier at another NAN compliant device or legacy device. An identifier generating unit 924 is configured to generate an identifier. Identifier selecting unit 924 is configured to generate an identifier, such as a MAC address, a NAN cluster ID, and the like, in accordance with rules associated with the identifier. A conflict identifying unit 926 is configured to detect a conflict arising from a non-unique identifier. A memory 930 is configured to store identifiers, identifiers to be tested, conflicting identifiers, non-conflicting identifiers, conflict query frames, conflict response frames, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while query frame processing unit 920, response frame processing unit 922, identifier selecting unit 924, and conflict identifying unit 926 may be software modules executing in a microprocessor (such as processor 915) or a custom circuit or a custom compiled logic array of a field programmable logic array. Query frame processing unit 920, response frame processing unit 922, identifier selecting unit 924, and conflict identifying unit 926 may be modules stored in memory 930.

Figure 10:
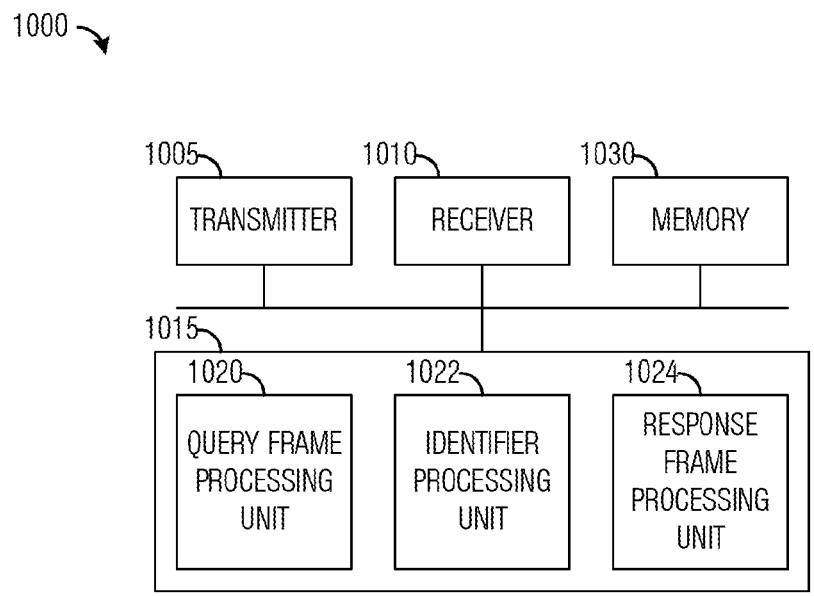
FIG. 10 illustrates an example second communications device according to example embodiments described herein.

FIG. 10 illustrates an example second communications device 1000. Communications device 1000 may be an implementation of a NAN compliant receiving device, such as a communications controller, such as an eNB, a base station, a NodeB, a controller, and the like, or a UE, such as a user, a subscriber, a terminal, a mobile, a mobile station, and the like. Communications device 1000 may be used to implement various ones of the embodiments discussed herein. As shown in FIG. 10, a transmitter 1005 is configured to transmit frames, conflict response frames, and the like. Communications device 1000 also includes a receiver 1010 that is configured to receive frames, conflict query frames, and the like.

A query frame processing unit 1020 is configured to process a received a conflict query frame, such as a Conflict Query frame, a RTS frame, and the like. Query frame processing unit 1020 is configured to determine an identifier to be tested in the conflict query frame. An identifier processing unit 1022 is configured to determine if an identifier stored in an Address 1 field of the conflict query frame conflicts with an identifier used by communications device 1000. A response frame processing unit 1022 is configured to generate a conflict response frame, such as a Conflict Response frame, a CTS frame, and the like. Response frame processing unit 1022 is configured to generate the conflict response frame if the identifier to be tested as provided in the received conflict query frame matches with an identifier used by communications device 1000. A memory 1030 is configured to store identifiers, identifiers to be tested, conflicting identifiers, non-conflicting identifiers, conflict query frames, conflict response frames, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while query frame processing unit 1020, identifier processing unit 1022, and response frame processing unit 1024 may be software modules executing in a microprocessor (such as processor 1015) or a custom circuit or a custom compiled logic array of a field programmable logic array. Query frame processing unit 1020, identifier processing unit 1022, and response frame processing unit 1024 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for detecting and resolving a conflict by a first device, the method comprising:
   transmitting, by the first device, a conflict query frame including a first address field containing a first locally assigned identifier associated with the first device, wherein the conflict query frame further includes a first frame type field, a value of the first frame type field being equal to a value of a frame type field of a Request-to-Send (RTS) frame of an Institute of Electrical and Electronics Engineers (IEEE) 802 standard;
   determining, by the first device, if a conflict notification corresponding to the conflict query frame is received within a specified time interval after transmitting the conflict query frame;
   discontinuing, by the first device, use of the first locally assigned identifier if the conflict notification is received within the specified time interval; and
   continuing, by the first device, use of the first locally assigned identifier if the conflict notification is not received within the specified time interval.

2. The method of claim 1, wherein the first locally assigned identifier comprises one of a local media access control (MAC) address, a neighbor awareness networking (NAN) cluster identifier, a service identifier, and a group identifier.

3. The method of claim 1, wherein the conflict query frame includes a second address field, the conflict notification comprises a conflict response frame, and the conflict response frame includes a third address field, and wherein a value of the third address field of the conflict response frame is equal to a value of the second address field of the conflict query frame.

4. The method of claim 1, wherein the conflict query frame includes a first Duration field, and wherein the conflict notification includes a second Duration field including a first value that is equal to a second value included in the first Duration field minus a sum of a duration of the conflict notification and a duration of a short inter-frame space.

5. The method of claim 1, wherein the conflict query frame further comprises a first frame subtype field, a value of the first frame subtype field being equal to a value of a frame subtype field of the RTS frame.

6. The method of claim 1, wherein the conflict notification comprises a Clear-to-Send (CTS) frame of the IEEE 802 standard.

7. The method of claim 3, wherein the conflict response frame includes a second frame type field and a second frame subtype field, and wherein a value of the second frame type field is equal to a value of a frame type field of a Clear-to-Send (CTS) frame, and a value of the second frame subtype field is different from a value of a frame subtype field of the CTS frame.

8. The method of claim 6, wherein the CTS frame is received from a legacy device, and wherein the first locally assigned identifier contained in the conflict query frame matches a media access control (MAC) address associated with the legacy device.

9. The method of claim 6, wherein the CTS frame is received from a second device, and wherein the first locally assigned identifier contained in the conflict query frame matches a second locally assigned identifier associated with the second device, wherein the second locally assigned identifier comprises one of a local media access control (MAC) address, a neighbor awareness networking (NAN) cluster identifier, a service identifier, and a group identifier.

10. The method of claim 4, wherein the second value is equal to the sum of the duration of the conflict notification and the duration of the short inter-frame space.

11. The method of claim 1, wherein the specified time interval is a time interval spanning ends of the conflict query frame and of the conflict notification, and wherein the specified time interval has a nominal value that is equal to a sum of a duration of the conflict notification and a duration of a short inter-frame space.

12. The method of claim 3, wherein the first locally assigned identifier is also contained in the second address field.

13. The method of claim 3, wherein the first address field is a Receiver Address field, the second address field is a Transmitter Address field, and the third address field is a Receiver Address field.

14. A method for operating a second device, the method comprising:
   receiving, by the second device, a conflict query frame including a first address field containing a first locally assigned identifier associated with a first device, wherein the conflict query frame further includes a second address field and has a structure of a first legacy frame; and
   transmitting, by the second device, a conflict response frame, beginning at a specified time, in response to determining that the first locally assigned identifier matches a second locally assigned identifier associated with the second device, wherein the conflict response frame has a structure of a second legacy frame, and wherein the conflict response frame includes
      a third address field containing a first value that is equal to a second value contained in the second address field, and
      a second Duration field including a third value that is equal to a fourth value included in a first Duration field of the conflict query frame minus a sum of a duration of the conflict response frame and a duration of a short inter-frame space.

15. The method of claim 14, wherein the first and the second locally assigned identifiers comprise one of a local media access control (MAC) address, a neighbor awareness networking (NAN) cluster identifier, a service identifier, and a group identifier.

16. The method of claim 14, wherein values in frame type fields and subtype fields of the conflict query frame and of the first legacy frame are equal.

17. The method of claim 14, wherein the first legacy frame comprises a Request-to-Send frame, and wherein the second legacy frame comprises a Clear-to-Send frame.

18. The method of claim 14, wherein values in frame type fields and subtype fields of the conflict response frame and the second legacy frame are equal.

19. The method of claim 14, wherein values in frame type fields or subtype fields of the conflict response frame and the second legacy frame are different.

20. The method of claim 14, wherein the conflict query frame is differentiated from the first legacy frame that is transmitted for reserving a medium for data transmission in that the first locally assigned identifier is also contained in the second address field.

21. The method of claim 14, wherein the conflict query frame is differentiated from the first legacy frame that is transmitted for reserving a medium for data transmission in that the first Duration field includes a fifth value that is equal to the sum of the duration of the conflict response frame and the duration of the short inter-frame space.

22. The method of claim 14, wherein the specified time is a time that has a nominal value of a sum of a time when an end of the conflict query frame is received and a value of the short inter-frame space.

23. The method of claim 14, wherein the first address field is a Receiver Address field, the second address field is a Transmitter Address field, and the third address field is a Receiver Address field.

24. A method for operating a first IEEE 802.11 compliant device, the method comprising:
    transmitting, by the first IEEE 802.11 compliant device, a Request-to-Send (RTS) frame including a first Receiver Address field containing a first locally assigned identifier associated with the first IEEE 802.11 compliant device, wherein the Request-to-Send frame also includes a Transmitter Address field;
    determining, by the first IEEE 802.11 compliant device, if a Clear-to-Send (CTS) frame corresponding to the Request-to-Send frame is received within a specified time interval after transmitting the Request-to-Send frame, wherein the Clear-to-Send frame includes a second Receiver Address field containing a first value that is equal to a second value contained in the Transmitter Address field;
    discontinuing, by the first IEEE 802.11 compliant device, use of the first locally assigned identifier if the Clear-to-Send frame corresponding to the Request-to-Send frame is received within the specified time interval; and
    continuing, by the first IEEE 802.11 compliant device, use of the first locally assigned identifier if the Clear-to-Send frame corresponding to the Request-to-Send frame is not received within the specified time interval.

25. The method of claim 24, wherein the first locally assigned identifier comprises one of a local media access control (MAC) address, a neighbor awareness networking (NAN) cluster identifier, a service identifier, and a group identifier.

26. The method of claim 24, wherein the Request-to-Send frame further includes a first Duration field, and wherein the Clear-to-Send frame corresponding to the Request-to-Send frame further includes a second Duration field that includes a third value that is equal to a fourth value included in the first Duration field minus a sum of a duration of the Clear-to-Send frame and a duration of a short inter-frame space.

27. The method of claim 24, wherein the Clear-to-Send frame is received from a legacy IEEE 802.11 compliant device and the first locally assigned identifier contained in the first Receiver Address field matches a media access control (MAC) address associated with the legacy IEEE 802.11 compliant device.

28. The method of claim 24, wherein the Clear-to-Send frame is received from a second IEEE 802.11 compliant device and the first locally assigned identifier contained in the first Receiver Address field matches a second locally assigned identifier associated with the second IEEE 802.11 compliant device.

29. The method of claim 24, wherein the Request-to-Send frame further includes a first Duration field including a fifth value that is equal to a sum of a duration of the Clear-to-Send frame and a duration of a short inter-frame space.

30. The method of claim 24, wherein the specified time interval is a time interval spanning ends of the Request-to-Send frame and the Clear-to-Send frame corresponding to the Request-to-Send frame, and wherein the specified time interval has a nominal value that is equal to a sum of a duration of the Clear-to-Send frame and a duration of a short inter-frame space.

31. The method of claim 24, wherein the first locally assigned identifier is also contained in the Transmitter Address field.

32. A method for operating a second IEEE 802.11 compliant device, the method comprising:
    receiving, by the second IEEE 802.11 compliant device, a Request-to-Send (RTS) frame including a first Duration field, a first Receiver Address field, and a Transmitter Address field;
    determining, by the second IEEE 802.11 compliant device, if the Request-to-Send frame is for testing potential conflict with a first locally assigned identifier associated with a first IEEE 802.11 compliant device, wherein the first locally assigned identifier is contained in the first Receiver Address field;
    determining, by the second IEEE 802.11 compliant device, if the first locally assigned identifier matches a second locally assigned identifier associated with the second IEEE 802.11 compliant device, in response to determining that the Request-to-Send frame is for testing potential conflict; and
    transmitting, by the second IEEE 802.11 compliant device, a Clear-to-Send (CTS) frame, beginning at a specified time, in response to determining that the first locally assigned identifier matches the second locally assigned identifier, wherein the Clear-to-Send frame includes,
        a second Receiver Address field containing a first value that is equal to a second value contained in the Transmitter Address field, and
        a second Duration field including a third value that is equal to a fourth value included in the first Duration field minus a sum of a duration of the Clear-to-Send frame and a duration of a short inter-frame space.

33. The method of claim 32, wherein the first and the second locally assigned identifiers comprise one of a local media access control (MAC) address, a neighbor awareness networking (NAN) cluster identifier, a service identifier, and a group identifier.

34. The method of claim 32, wherein determining if the Request-to-Send frame is for testing potential conflict comprises:
    determining if values contained in the first Receiver Address field and the Transmitter Address field are equal, wherein the Request-to-Send frame is for testing potential conflict if the values in the first Receiver Address field and the Transmitter Address field are equal, and wherein the Request-to-Send frame is not for testing potential conflict if the values in the first Receiver Address field and the Transmitter Address field are not equal.

35. The method of claim 32, wherein determining if the Request-to-Send frame is for testing potential conflict comprises:

determining if the first Duration field contains a fifth value that is equal to the sum of the duration of the Clear-to-Send frame and the duration of the short inter-frame space, wherein the Request-to-Send frame is for testing potential conflict if the fifth value is equal to the sum of the duration of the Clear-to-Send frame and the duration of the short inter-frame space, and wherein the Request-to-Send frame is not for testing potential conflict if the fifth value is not equal to the sum of the duration of the Clear-to-Send frame and the duration of the short inter-frame space.

36. The method of claim 32, wherein the specified time is a time that has a nominal value of a sum of a time when an end of the Request-to-Send frame is received and the duration of the short inter-frame space.

37. A device for detecting and resolving a conflict, comprising:

a transmitter configured to transmit a conflict query frame including a first address field containing a locally assigned identifier associated with the device, wherein the conflict query frame further includes a first frame type field, a value of the first frame type field being equal to a value of a frame type field of a Request-to-Send (RTS) frame of an Institute of Electrical and Electronics Engineers (IEEE) 802 standard;

a receiver configured to receive frames; and a processor operatively coupled to the transmitter and to the receiver, the processor configured to determine if a conflict notification corresponding to the conflict query frame is received within a specified time interval after transmitting the conflict query frame, to discontinue use of the locally assigned identifier if the conflict notification is received within the specified time interval, and to continue use of the locally assigned identifier if the conflict notification is not received within the specified time interval.

38. The device of claim 37, wherein the locally assigned identifier comprises one of a local media access control (MAC) address, a neighbor awareness networking (NAN) cluster identifier, a service identifier, and a group identifier.

39. The device of claim 37, wherein the conflict query frame includes a second address field, the conflict notification comprises a conflict response frame, and the conflict response frame includes a third address field, and wherein a value of the third address field of the conflict response frame is equal to a value of the second address field of the conflict query frame.

40. The device of claim 37, wherein the conflict query frame includes a first Duration field, and wherein the conflict notification includes a second Duration field including a first value that is equal to a second value included in the first Duration field minus a sum of a duration of the conflict notification and a duration of a short inter-frame space.

41. The device of claim 37, wherein the conflict query frame further comprises a first frame subtype field, a value of the first frame subtype field is equal to a value of a frame subtype field of the RTS frame.

42. The device of claim 39, wherein the locally assigned identifier associated with the device is also contained in the second address field of the conflict query frame.

43. The device of claim 39, wherein the first address field is a Receiver Address field, the second address field is a Transmitter Address field, and the third address field is a Receiver Address field.

44. A second device comprising:

a receiver configured to receive a conflict query frame including a first address field containing a first locally assigned identifier associated with a first device, wherein the conflict query frame further includes a second address field and has a structure of a first legacy frame;

a processor operatively coupled to the receiver, the processor configured to determine if the first locally assigned identifier matches a second locally assigned identifier associated with the second device; and a transmitter operatively coupled to the processor, the transmitter configured to transmit a conflict response frame, beginning at a specified time, in response to determining that the first locally assigned identifier matches the second locally assigned identifier, wherein the conflict response frame has a structure of a second legacy frame, and wherein the conflict response frame includes a third address field containing a first value that is equal to a second value contained in the second address field, and a second Duration field including a third value that is equal to a fourth value included in a first Duration field of the conflict query frame minus a sum of a duration of the conflict response frame and a duration of a short inter-frame space.

45. The second device of claim 44, wherein the first and the second locally assigned identifiers comprise one of a local media access control (MAC) address, a neighbor awareness networking (NAN) cluster identifier, a service identifier, and a group identifier, and wherein values in frame type fields and subtype fields of the conflict query frame and of the first legacy frame are equal.

46. The second device of claim 44, wherein the first legacy frame comprises a Request-to-Send frame, and wherein the second legacy frame comprises a Clear-to-Send frame.

47. The second device of claim 44, wherein the conflict query frame is differentiated from the first legacy frame that is transmitted for reserving a medium for data transmission in that the first locally assigned identifier is also contained in the second address field.

48. The second device of claim 44, wherein the conflict query frame is differentiated from the first legacy frame that is transmitted for reserving a medium for data transmission in that the first Duration field includes a fifth value that is equal to the sum of the duration of the conflict response frame and the duration of the short inter-frame space.

* * * * *